Nov. 12, 1968  J. M. FISHER  3,410,508
INFLATABLE SEAL
Filed Oct. 21, 1966  2 Sheets-Sheet 2
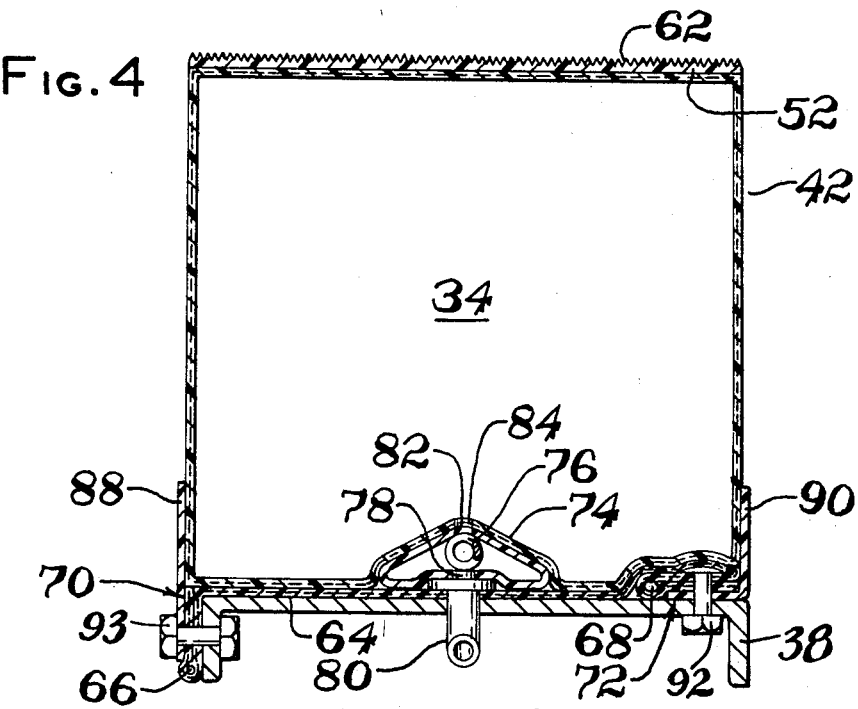
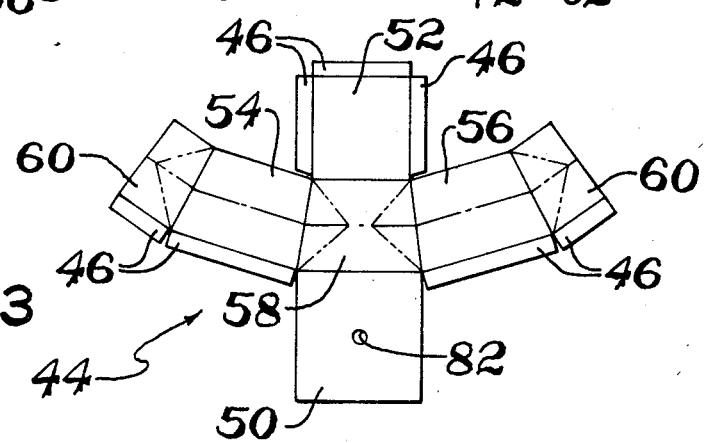
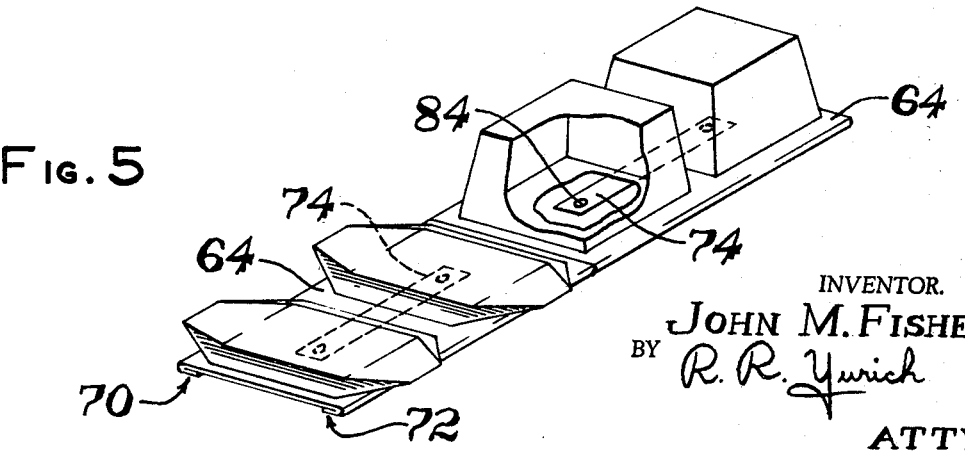
INVENTOR.
JOHN M. FISHER
BY R. R. Yurich
ATTY.

Nov. 12, 1968  J. M. FISHER  3,410,508

INFLATABLE SEAL

Filed Oct. 21, 1966  2 Sheets-Sheet 1

INVENTOR.
JOHN M. FISHER
BY R. R. Yurich
ATTY.

United States Patent Office 3,410,508
Patented Nov. 12, 1968

3,410,508
INFLATABLE SEAL
John M. Fisher, Cuyahoga Falls, Ohio, assignor to The B. F. Goodrich Company, New York, N.Y., a corporation of New York
Filed Oct. 21, 1966, Ser. No. 588,598
13 Claims. (Cl. 244—102)

ABSTRACT OF THE DISCLOSURE

This disclosure relates to inflatable seals or closures having inflatable segmented elements which inflate to cooperatively close an opening, and which are especially useful for closing the gap between a retracted aircraft tire and the periphery of its corresponding wheel well opening.

---

This invention relates to inflatable seals and more particularly to an inflatable seal particularly suitable for closing the area between the opening of the wheel well cavity in an aircraft and the outer diameter of a fully retracted aircraft tire in the cavity while maintaining a relatively smooth exterior surface over this area between the cavity opening and the tire.

Conventionally, the retracted aircraft tire is fully sealed within its corresponding wheel well or cavity by means of a hydraulically actuated metal door which is hinged to swing away from the tire cavity when the tire is to be extended. This door encloses the entire wheel assembly and provides a smooth airfoil over the cavity into which the aircraft tire is retractable. The use of such a metal door to provide a smooth airfoil has many drawbacks. One important drawback is the fact that the weight of the door and the auxiliary equipment necessary to operate the door substantially decreases the performance potential of the aircraft.

Moreover, during takeoff the extended doors create an undesirable drag on the aircraft. Therefore, it is desirable to provide a device that will eliminate this heavy door assembly and at the same time maintain a substantially smooth contour at the point where the aircraft tire is retracted.

One method of eliminating the wheel well door is to simply remove the door and permit the outermost side of the retracted aircraft tire to be exposed. The wheel rim portion of the tire could include a smooth wheel cover which would give the exterior side of the tire and wheel unit a relatively smooth contour consisting of the wheel cover and the tire sidewall.

However, the wheel well diameter or cavity opening which receives the tire and wheel unit must be substantially larger than the outside diameter of the tire to permit the unobstructed retraction of the tire and wheel into the cavity and to allow for growth of the aircraft tire.

This difference in diameter results in a substantial gap around the periphery of the tire between the tire and the cavity diameter. This gap must be filled or closed in order to prevent air from flowing into this gap thereby creating burdensome air turbulence at the periphery of the aircraft wheel well. In addition, this gap should be closed to prevent rain and ice formation inside the cavity. Therefore, to effectively utilize the exposed side of the tire and wheel as an airfoil, it is necessary to fill this void between the tire and its cavity opening.

One device for filling the void between the tire and its cavity is an inflatable torus seal located between the tire and its well cavity. It is essential that the inside diameter of this uninflated torus be greater than the outside diameter of the aircraft tire in order to permit the free swinging of the aircraft wheel from its fully extended position to its retracted position inside the inner diameter of the torus.

Furthermore, the inside diameter of the inflatable torus must be capable of decreasing substantially on inflation in order for this inside diameter to press against the outer circumference of the tire to assure complete sealing contact against the tire and eliminate any smaller secondary gaps around the inner periphery of the seal.

A torus which would provide this required ability to substantially reduce its inside diameter on inflation must be constructed of a highly stretchable material. This material would be subjected to numerous inflation cycles and would be held in its fully stretched condition during most of the flight operation. Therefore, the material demands made on inflatable torus seals of this type of seal are extremely critical.

In addition to the foregoing disadvantages, an inflatable torus would extend around the entire periphery of the aircraft tire. This design would not readily permit the use of conventional landing gear struts located on the wheel well side of the aircraft tire since the strut must then first pass through the periphery of the wheel well opening before the tire could be enclosed by the wheel well cavity. Furthermore, if the strut is located on the non-wheel well side of the aircraft tire a special design would have to be developed to eliminate the exposed strut.

Accordingly, an improved inflatable seal for aircraft wheel wells must provide a collapsed or uninflated inside diameter substantially greater than the outside diameter of the aircraft tire and an inflated or operative inside sealing diameter less than the outside diameter of the same tire.

This seal, in addition to having these dimensional capabilities, must provide, during the periods of operation where the tires are fully retracted, an operational exposed surface that substantially blends with the smooth skin line of the aircraft and the tire and wheel cover unit.

Furthermore, an improved wheel well seal must make provision for the sweeping of the landing gear strut into the wheel well area and the subsequent encircling of the entire periphery of the aircraft tire to fully seal off the area between the tire and its wheel well cavity opening.

According to this invention, an inflatable seal that provides the foregoing characteristics has a series of inflatable segmental pads attached around the inner periphery of the aircraft wheel well or cavity and a manifold system for communicating a pressure supply to the segmental bags for fully inflating the bags to seal the region between the outer periphery of a retracted aircraft tire and the larger inner periphery of the tire's corresponding wheel well cavity opening.

The following description and drawings illustrate a landing gear assembly with inflatable wheel well seal made according to and incorporating the preferred embodiments of this invention. In the drawings:

FIG. 3 is a plan view of a preferred pattern of material used for fabricating an independent segment or bag of the seal;

FIG. 4 is a cross-sectional view of one inflated sealing segment of the improved wheel well seal;

FIG. 5 is a perspective view of an unattached portion of the improved inflatable seal showing one pair of inflatable segmented elements in their inflated condition and a second pair of inflatable segmented elements in their uninflated or collapsed condition.

Figure 1:
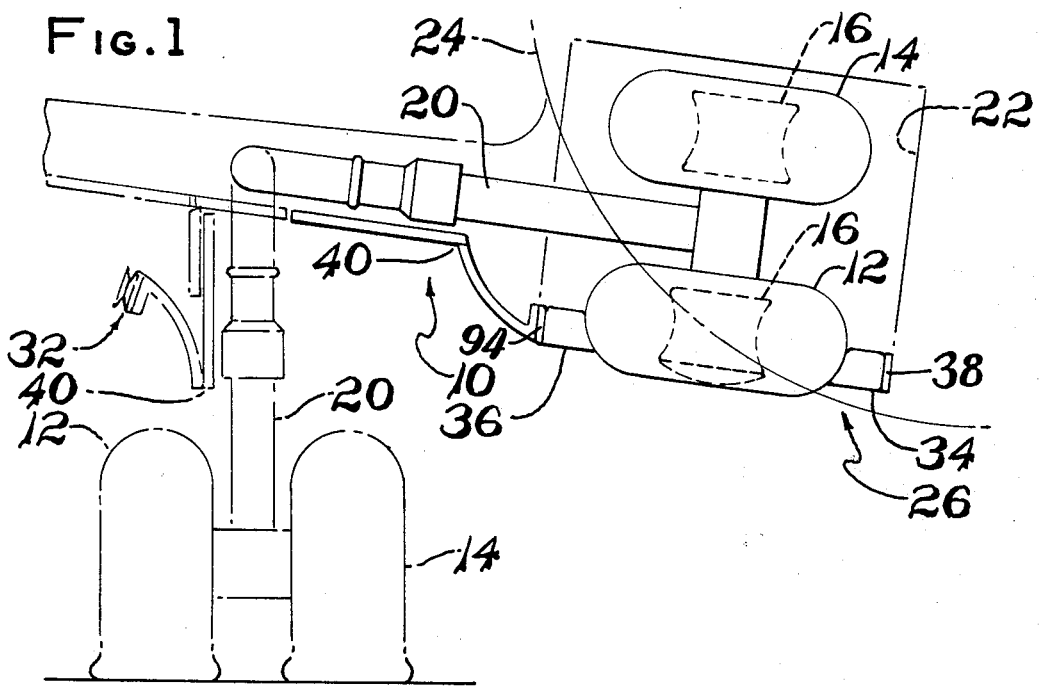
FIG. 1 is a front elevation of the landing gear assembly shown in its extended position by broken lines and in its fully retracted position shown by the bold or solid lines.
Figure 2:
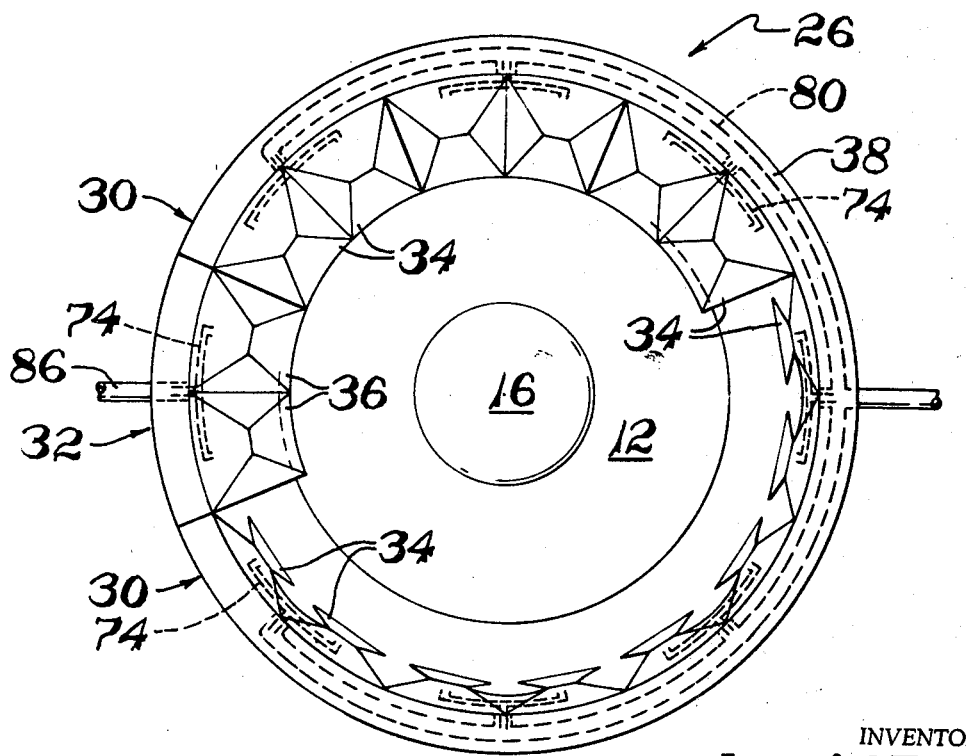
FIG. 2 is an elevated view of the improved wheel well seal of the landing gear assembly showing the seal with its upper half being fully inflated and the lower half showing the seal fully collapsed or uninflated.

Referring to FIG. 1, the landing gear assembly 10 includes a set of dual tires 12 and 14 with their respective wheels 16 and 18, and a conventional landing strut 20. These members of the landing gear assembly 10 are retractable into a wheel well cavity 22, which in this instance is located partially in the fuselage 24 of an aircraft. The landing gear assembly 10 further includes an inflatable wheel well seal 26, which seals the area between the outside diameter of the outermost tire 12 and the inner periphery of the opening of wheel well cavity 22. This inflatable seal 26 has a stationary sealing member 30 which extends around most of the periphery of the opening of cavity 22 except for a portion filled by a separable inflation member 32, as shown in FIG. 2. The stationary seal member 30 consists of a plurality of segmental inflatable bags 34, 34, and the separable inflation member 32 consists of a single pair of similar inflatable bags 36, 36.

Referring to FIG. 2, the series of segmented inflatable bags or cells 34, 34 of the stationary sealing member 30 are mounted, preferably in pairs, to the inner periphery of a cavity frame 38 which forms the opening of wheel well cavity 22. The lower half of the wheel well seal 26 of FIG. 2 illustrates these inflatable bags 34, 34 in their fully collapsed or deflated condition. The upper half of the seal 26 of FIG. 2 illustrates the condition of bags 34, 34 in their fully inflated condition. In this inflated condition, the adjacent sides of bags 34, 34 bear against each other to form a full sealing body inside the inner periphery of cavity frame 38.

The pair of inflatable bags 36, 36 comprising separable member 32 are attached to a strut hinge 40 that is pivotally connected to the outermost side of strut 20. When the landing gear assembly 10 is in its fully retracted position, this strut hinge 40 with separable member 32 is pivoted towards strut 20 to the position shown in solid lines in FIG. 1. In this position, the inflatable bags 36 of separable member 32 and the inflatable bags 34, 34 of stationary seal member 30 form a continuous series of inflatable segments around the entire inner periphery of the opening of wheel well cavity 22. When the bags 34, 34 of stationary seal member 30 and the bags 36, 36 of separable segment 32 are fully inflated, they provide full sealing between the outer diameter of tire 12 and the inside diameter of cavity frame 38 as shown in FIG. 1 and FIG. 2.

Referring to FIG. 4, each of the individual inflatable bags 34 and 36 include a one-ply body carcass 42, preferably of a rubber coated square woven fabric material which may be fabricated from a pattern of material such as the pattern 44 shown in FIG. 3. When pattern 44 is folded on the solid lines of FIG. 3 and cemented at mating margins 46, 46, the assembled pattern 44 forms a substantially rectangular prism consisting of an attachment side 50, an opposite tire sealing surface 52, two opposing sealing sides 54 and 56, which bear against the adjacent bags of seal 26, and two non-sealing sides 58 and 60, side 58 forming the surface which is exposed and blends with the aircraft skin line and side 60 being the free side inside wheel well cavity.

The tire sealing surface 52 is preferably covered by an abrasive resistant rubber tread 62 as shown in FIG. 4, in order to protect the carcass body 42 of bags 34 and 36 from being cut by foreign surface particles which may become embedded in the outer periphery of the aircraft tire 12.

The bags 34, 34 of the stationary seal member 30 and the two bags 36, 36 of the separable sealing member 32, which comprise inflatable seal 26, are mounted in pairs to an attachment panel 64, as typically shown in FIG. 5. While these bags may be mounted individually or in a complete series, it is the preferred method to mount the inflatable bags 34 and 36 in pairs to facilitate their installation and to permit the quick removal and replacement of any damaged bags by merely replacing the damaged pair of bags.

Referring to FIG. 4, the attachment panels 64, 64 are preferably made from a single ply rubber coated square woven fabric material. The opposite edges of the panel 64 are turned back over a pair of opposite lengthwise rubber bead strips 66 and 68 to form respective reinforced marginal strips 70 and 72.

Each attachment panel 64 further includes a rubber manifold tube 74 which is attached to panel 64 along its center line between margins 70 and 72. A helical coil spring 76 is placed inside manifold tube 74 along its length to prevent tube 74 from collapsing during any deflation cycle. The manifold tube 74 has a supply nozzle 78 which is adapted for communicating air from a suitable air supply line 80 to the interior of its mating pair of bags 34, 34 through a corresponding inlet port 82 on the attachment face of each of the bags and two outlet ports 84 on manifold tube 74, as shown in FIGS. 2, 4 and 5. Similarly, the bags 36, 36 of the separable seal is supplied by a supply line 86 as shown in FIG. 2.

The bags 34 or 36 are attached initially to panel 64 by a pair of rubber margin strips 88 and 90 which extend along the base of exposed surface 58 and 60 of bags 34 or 36 and over the margins 70 and 72 of attachment panel 64.

Prior to vulcanization of the bags 34 or 36 on their corresponding attachment panels, each bag is further folded to its fully collapsed position. Referring to FIG. 3, the preferred manner of folding the inflatable bags is to inwardly fold the sealing sides 54 and 56 on dot-dash line and both inwardly fold on the dot-dash line and outwardly fold on the dotted line, the non-sealing sides or exposed sides 58 and 60. When completely folded in this manner, the bags 34 or 36 form the flat configuration or collapsed position shown in FIG. 5. The bags are then vulcanized to panel 64 to impart permanent creases in the sides of bags. By curing the bags in this fully folded or collapsed condition the bags 34 and 36 may be inflated to the approximate shape shown in FIG. 5 and the resiliency of their carcass body 42 assures that when the bags are evacuated they will return to their collapsed position.

In the actual manufacture of the seal, it is preferred that the interior of the bags be coated or dusted with soapstone or other suitable powdery material to prevent the collapsed sides of the bags from curing together. It has been found to be desirable to use a two stage cure for curing the pairs of bags. This is accomplished by first curing the pattern of carcass material to assure that the folding of the pattern to its rectangular block form will not squeeze out material at the folds. The second cure is performed on the fully collapsed bags on their respective attachment panels. In addition, it is preferred that the surface of the bags be coated with a Teflon material to prevent sticking of the bags when in operation and to protect the bags from fluid contaminants which may result from the aircraft operation.

The fabricated pairs of bags 34 on their corresponding attachment panels 64, 64 are attached to the inner surface periphery of cavity frame 38 by positioning the back of panel 64 against this surface and reversely folding the margin edge 72 of bag 34 back 180° and attaching this reversely folded portion to the frame 38 with a fastener 92 as shown in FIG. 4. This manner of attachment will preserve the substantially smooth airfoil surface at the union of frame 38 and panel 64. The opposite margin edge 70 of panel 64 may be attached to frame 38 in a number of ways since it is not necessary to preserve the smooth airfoil surface because this attachment is made within the wheel well cavity 22. Therefore, this margin edge 70 is attached in this instance to a radial edge of frame 38 in the manner shown in FIG. 4 by fastener 93.

Similarly, the separable inflation member 32 of seal 26 has a single pair of bags 36, 36 with one attachment panel 64 which is attached to a lip 94 on strut hinge 40 in the same manner disclosed for attachment of the bags 34, 34 to cavity frame 38.

In operation, the mounted wheel well seal 26, when uninflated, assumes its fully withdrawn or collapsed position shown typically in the lower half of the seal assembly shown in FIG. 2. The bags 36, 36 on separable member 32 are also collapsed on the strut hinge 40 with hinge 40 being either extended or retracted. The resiliency of the vulcanized bags 34 or 36 assures that each inflatable bag 34 or 36 will return to this collapsed or withdrawn position whenever the air is evacuated from the bags. When the bags 34, 34 of stationary sealing member 30 are in this collapsed position, the inside diameter formed by the bags greatly exceeds the outside diameter of tires 12 and 14 and therefore the strut 20 with its tires 12 and 14 can pivot from its extended position shown in broken lines of FIG. 1 to its retracted position without touching the deflated or collapsed bags 34. After full retraction of the strut 20, strut hinge 40 pivots counterclockwise to its retracted position shown in FIG. 1, wherein the bags 36, 36 of separable member 32 line up with the bags 34, 34 of stationary sealing member 30 as viewed in FIG. 2. After the strut 20 and separable seal member 32 are retracted, the inflatable bags 34 and 36 are fully inflated by a suitable pressure source, to their fully inflated or sealing position shown typically in the upper half of the seal assembly of FIG. 2.

The inflatable bags 34 and 36 are designed so that when fully inflated they establish a full sealing closure having an inside diameter less than the anticipated outer diameter of aircraft tire. The eventual growth of the aircraft tire will result in a greater outside diameter of the tire which merely reduces the distance that the bags 34 and 36 need be inflated to seal the entire periphery of the area between the tire and the wheel well opening.

I claim:

1. An inflatable aircraft wheel well seal for closing the space between a wheel well cavity opening and the outside diameter of an aircraft tire, whenever the tire and its landing strut is retracted into the wheel well cavity, comprising a plurality of inflatable bags attached around the inner periphery of said cavity opening, and means for supporting said bags so that when inflated at least two sides of each bag bears against adjacent bags and one side against the tire circumference to form a complete closure for the gap between the tire and its cavity opening.

2. An inflatable aircraft wheel well seal according to claim 1, wherein said seal further includes means for collapsing said bags to a substantially flat configuration against the inner peripheral surface of said cavity opening.

3. An inflatable aircraft wheel well seal according to claim 2 wherein each of said bags comprises a flexible body carcass having two substantially parallel opposing surfaces and inversely folded walls connecting said flat surfaces so that when inflated said folded walls unfold and the inflated carcass forms a substantially rectangular prism.

4. An inflatable aircraft wheel well seal according to claim 3, wherein said plurality of inflatable bags further includes at least one movable sealing element, which when separated from the seal provides a gap along the periphery of said cavity opening to allow the landing strut to pass through the periphery of the cavity opening during retraction of the landing strut.

5. In an aircraft wheel well seal, an inflatable sealing element comprising an inflatable bag of flexible air impervious material with opposing end walls and foldable sidewalls to enable the bag to collapse into a generally flat configuration when deflated, means for attaching one end wall of said bag to the rim of an aircraft wheel well, and means for communicating an inflation medium inside said bag to distend and unfold said sidewalls and separate said end walls.

6. An inflatable sealing element according to claim 5 wherein said bag is generally prism shaped when inflated to form one segment of an annulus made up of several other similar shaped bags.

7. Apparatus comprising a rim which is at least partially closed to define an opening bordered by the rim, a plurality of inflatable bags of flexible fabric mounted on said rim side by side within said opening, each bag having foldable sidewalls and opposing end walls one of which is mounted to said rim and the other end wall of which is adapted for displacement away from the rim on inflation of the bag, and means for inflating said bags to extend said other end walls into said opening and to press the adjoining sidewalls of the bags against each other.

8. Apparatus according to claim 7 wherein said rim has a concavely curved inner surface to which said bags are mounted, and said bags being shaped to mutually cooperate when inflated to provide a continuous wall along said concavely curved inner surface.

9. Apparatus according to claim 7 and further comprising a member enclosed by said rim in lateral spaced relation and having an external surface directed toward said rim which is sealingly engageable by the displaceable end wall of said bags when the bags are inflated.

10. Apparatus according to claim 9 wherein the inner surface of said rim and said external surface of said enclosed member are concentric with each other with a space of uniform width therebetween into which said bags expand when inflated.

11. Apparatus according to claim 10 wherein said inner surface of said rim and said external surface of said enclosed member are substantially circular.

12. Apparatus according to claim 7 wherein each said bag has a generally prism shape in its distended inflated position and is substantially flat in its deflated folded position.

13. Apparatus according to claim 10 wherein said bags cooperate in laterally abutting engagement when inflated to provide a substantially annular inflatable enclosure for said space between said surfaces.

References Cited

UNITED STATES PATENTS

| 594,269 | 11/1897 | McLeod | 152—338 |
| 1,051,738 | 1/1913 | Kavanagh | 152—338 |
| 2,378,589 | 6/1945 | Slack et al. | 115—34 |
| 2,382,817 | 8/1945 | Reiss | 244—121 XR |
| 3,126,048 | 3/1964 | Hollands | 160—40 |
| 3,178,779 | 4/1965 | Clark et al. | 49—477 |

MILTON BUCHLER, *Primary Examiner.*

P. E. SAUBERER, *Assistant Examiner.*